United States Patent
Bruce

[11] 3,841,203
[45] Oct. 15, 1974

[54] RECIPROCATING-PISTON ENGINES AND COMPRESSORS

[75] Inventor: Glenister Stuart Bruce, Brighton, England

[73] Assignee: Ricardo & Co., Engineers (1927) Limited, Sussex, England

[22] Filed: May 2, 1972

[21] Appl. No.: 249,730

[30] Foreign Application Priority Data
May 4, 1971  Great Britain ............... 13021/71

[52] U.S. Cl. .............................. 92/73, 123/195 H
[51] Int. Cl. .............................................. F01b 1/02
[58] Field of Search ................... 92/73; 123/195 H

[56] References Cited
UNITED STATES PATENTS
1,559,365  10/1925  Pepper ............................ 92/73 X
1,759,147  5/1930  Vincent ........................ 123/195 H FOREIGN PATENTS OR APPLICATIONS
602,113  7/1960  Canada .................................. 92/73

Primary Examiner—Edgar W. Geoghegan
Assistant Examiner—Abraham Hershkovitz
Attorney, Agent, or Firm—Cushman, Darby & Cushman

[57] ABSTRACT

A reciprocating-piston engine or compressor has the bearing caps of the main bearings of its crankshaft rigidly interconnected by means of a rigid beam bolted to the bearing caps and extending along the length of the crankshaft in the crankcase, the beam serving to improve crankshaft and crankcase stiffness. The beam can be attached to the main bearing caps after they have been assembled and secured to the crankcase to locate and support the crankshaft. The beam may be formed with oil ways and may carry the oil pump of the engine/compressor lubrication system.

9 Claims, 5 Drawing Figures

RECIPROCATING-PISTON ENGINES AND COMPRESSORS

This invention relates to multi-cylinder piston engines and compressors of the type in which a crankshaft is supported in a crankcase by means of main bearings and is connected through connecting rods to a plurality of reciprocating pistons. The invention is applicable inter alia to internal combustion engines and compressors of both in-line and V-configuration, and an object of the invention is to improve the overall crankcase and crankshaft bearing rigidity of such machines. Increased overall rigidity is beneficial to the operation of the bearings, and is particularly noticeable in reducing the overall noise level of the machine, especially in cases where the crankcase does not have a deep skirt, i.e., the lower face of the crankcase is at or close to the horizontal plane through the crankshaft bearing axis.

The above conclusion that engine noise reduction can be accomplished by increasing the overall rigidity of the machine has been discussed in a detailed theoretical paper by Priede, Grover and Lalor, published in the Society of Automotive Engineers Journal, paper No. 450, 1969. The paper discusses a crank frame and crank beam structure which reduces engine deformation and consequently the resultant noise is reduced. A major problem of such a structure as disclosed in the paper is that radical engine redesign is required. Therefore, in order to utilize the approach of engine stiffening to reduce noise, a crank beam has been produced which may be adapted for use with presently available engine designs and yet accomplish its purpose without elaborate redesign or substantial interference with access to the interior of the machine.

According to the present invention, the crankshaft main bearings have bearing caps which are rigidly interconnected by means of a rigid beam rigidly secured to the bearing caps and extending along the crankshaft in the crankcase. The beam is attachable to the main bearing caps after normal assembly of the crankshaft and main bearing caps with the crankcase. This considerably facilitates assembly as compared with known means for stiffening the crankcase bearing assembly.

In order to accommodate the throw of the cranks and big-end bearings above the rigid beam, main bearing caps of greater depth than usual may need to be provided.

The invention may be carried into practice in various ways, but one specific embodiment and certain modifications thereof will now be described by way of example only, with reference to the accompanying drawings in which.

Figure 1:
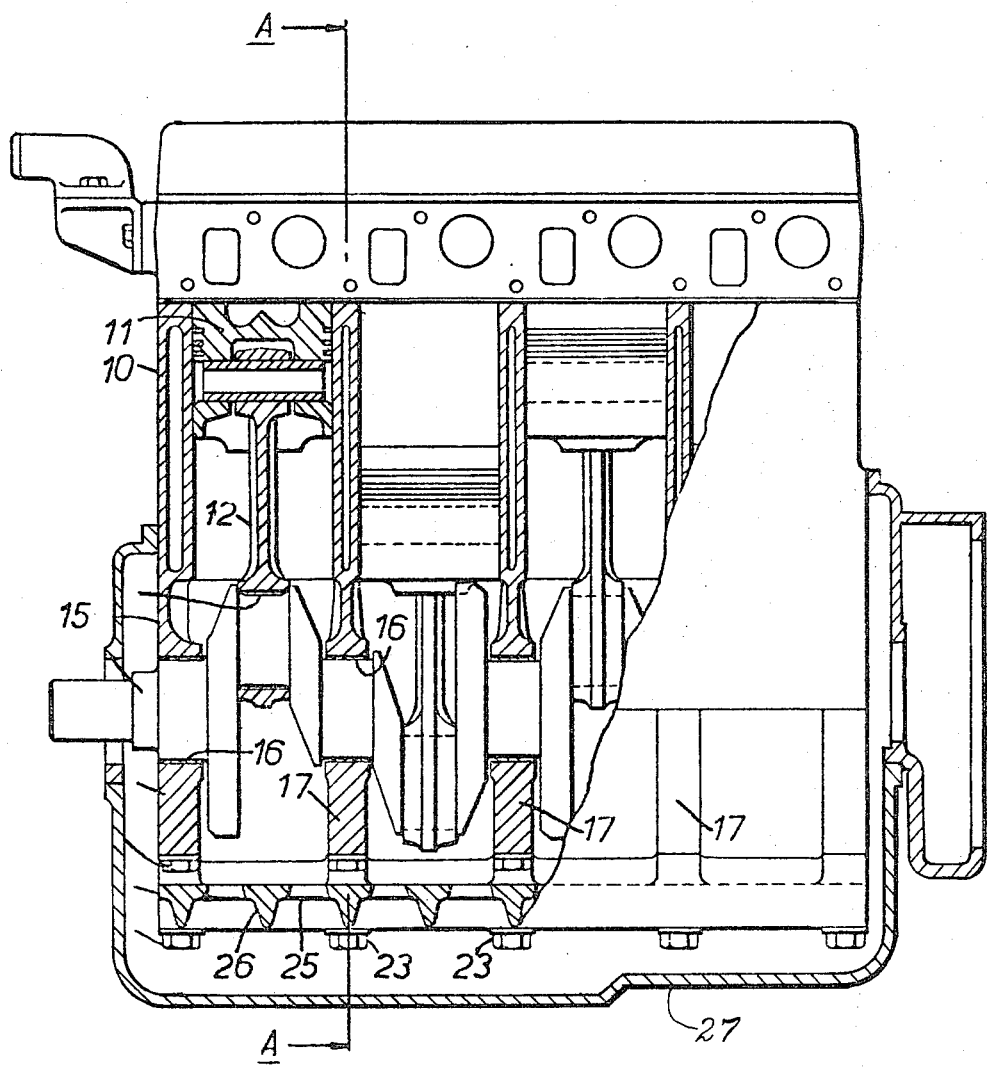
FIG. 1 is a longitudinal section through the crankcase of an internal combustion engine, the planes of section being shown by the line B—B in FIG. 2.
Figure 2:
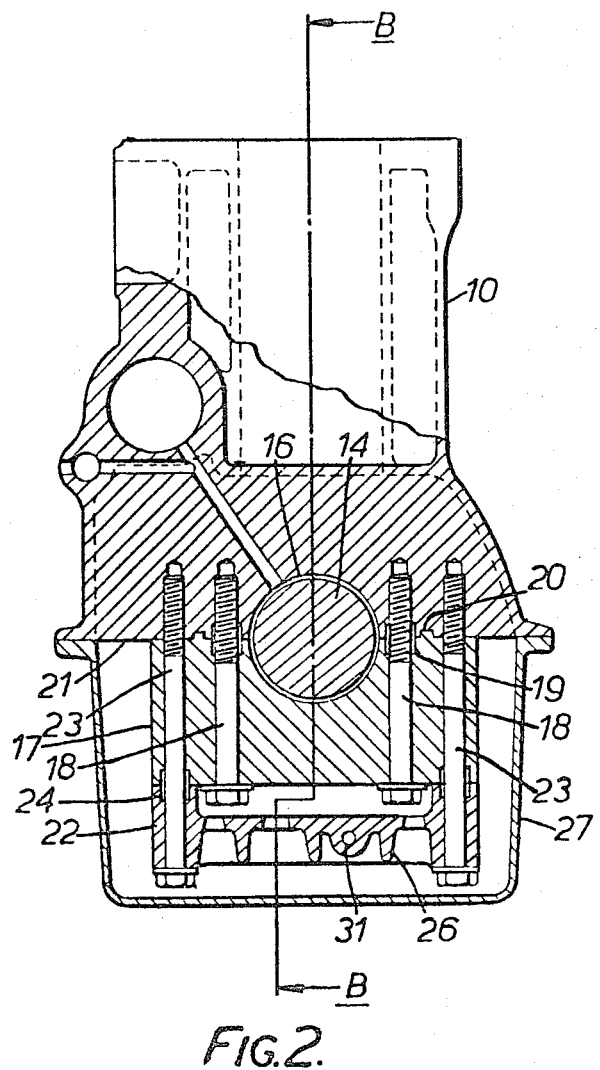
FIG. 2 is a cross-section of the crankcase and associated parts, taken on the line A—A of FIG. 1.

The engine shown in FIGS. 1 and 2 is a four-cylinder in-line internal combustion engine of the type specified above, having a cylinder block 10 with four cylinders containing sliding pistons 11 which are connected by connecting rods 12 to the big-end bearings 13 of the crankshaft 14 in the conventional manner. The crankshaft 14 is journalled in the crankcase 15 of the engine by means of five main bearings 16 fitted with removable main bearing caps 17 which are used to retain the crankshaft. Each main bearing cap 17 is secured initially to the crankcase 15 by means of two inner retaining bolts 18 and is located by means of ring dowels 19 and tenons 20. Alternatively only the tenons 20, or only the dowels 19, may be provided. As shown the dowels 19 are located around the inner retaining bolts 18, which are secured in tapped holes in the under face 21 of the crank case 15. Thus the crankshaft 14 an be assembled to the crankcase 15 in the normal manner by means of the main bearing caps 17 and inner retaining bolts 18.

A stiffening beam 22 is rigidly secured to the under sides of the main bearing caps 17 by means of outer retaining bolts 23 which extend through bores in the bearing caps 17 and are secured in tapped holes in the under face 21 of the crankcase. The beam 22 is dowelled to each main bearing cap 17 by means of ring dowels 24 located around the outer retaining bolts 23. The beam 22 is a rigid casting of iron or other suitable metal. Alternatively the beam could be fabricated from steel plate, or other metal plate. The beam is formed with holes 25 and/or ribs 26 in its large flat surfaces, as shown, to reduce noise radiation from the beam.

It will be appreciated that the beam 22 is thus secured in position by means of the outer retaining bolts 23, after the crankshaft 14 and main bearing caps 17 have already been assembled correctly by means of the inner retaining bolts 18. The whole assembly including the beam 22 will then be enclosed in the usual crankcase sump casing 27 secured to the upper part of the crankcase to contain lubricating oil.

Instead of passing through the main bearing caps 17 into the crankcase 15, the outer retaining bolts 23 could be secured into tapped holes in the main bearing caps 17.

Figure 3:
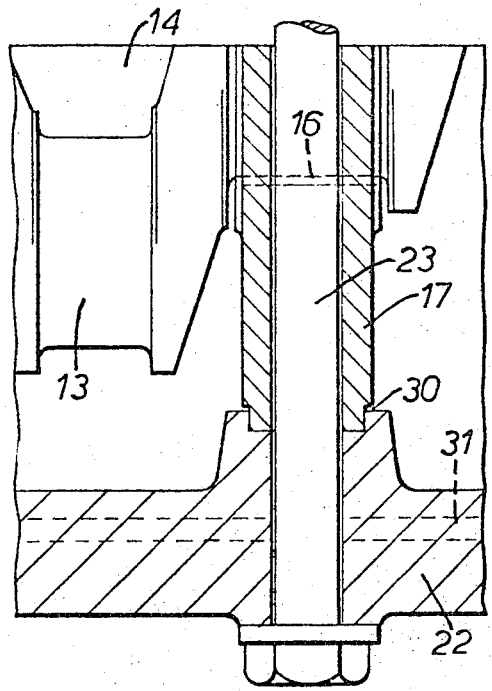
FIG. 3 is a fragmentary detail view on a larger scale showing a modified location arrangement for the stiffening beam in the engine of FIGS. 1 and 2.

FIG. 3 shows a modification of the arrangement of FIGS. 1 and 2 in which tenons 30 are used for locating the beam 22 in relation to the main bearing caps 17 and for ensuring rigidity, the tenons 30 extending along the under sides of the main bearing caps 17. However, in some cases neither tenons 30 nor ring dowels need be provided.

The beam 22 can also be employed to carry engine lubricating oil, oil ways 31 being provided in the form of either longitudinal or transverse holes drilled in the beam.

Figure 4:
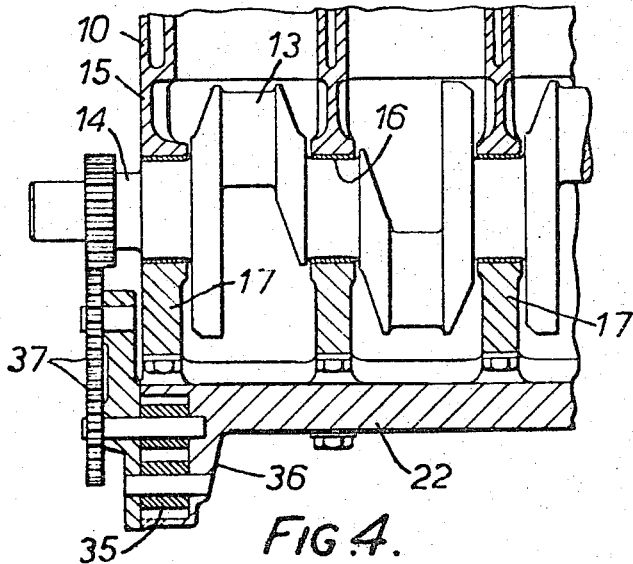
FIG. 4 shows in longitudinal section another arrangement of the engine in which the lubricating pump is mounted on the stiffening beam.

Another modified arrangement is illustrated in FIG. 4, in which the engine lubricating oil pump 35 is carried by the beam 22 at its forward end, the casing 36 of the oil pump forming an integral part of the beam 22. The oil pump 35 is driven by means of gear pinions 37 from the end of the crankshaft 14.

Figure 5:
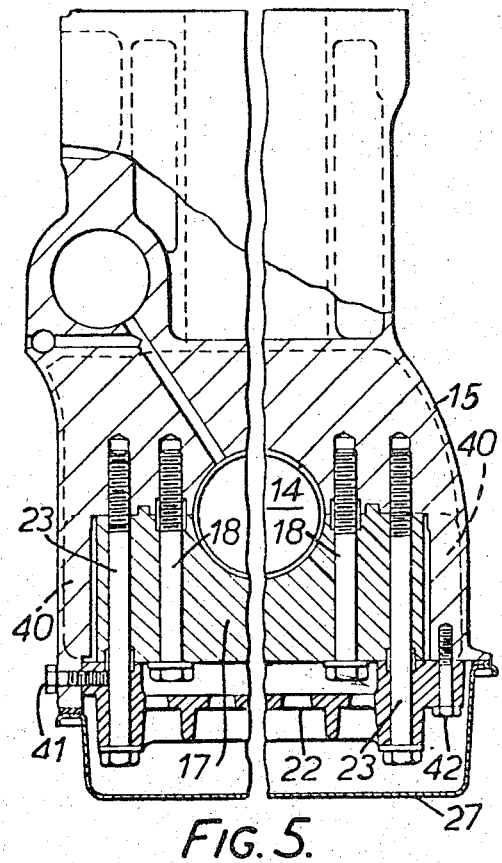
FIG. 5 is a cross-sectional view similar to FIG. 2 of another embodiment in which the stiffening beam is secured to the crankcase as well as to the main bearing caps.

FIG. 5 shows a further embodiment of the invention in which the crankcase 15 is formed with a deep integral skirt 40 which extends downwardly on either side of the main bearing caps 17. The stiffening beam 22 in addition to being located and secured to the main bearing caps 17 by the outer bolts 23, is also rigidly secured to the skirt 40 in order to increase the stiffness of the whole assembly. In the left hand part of FIG. 5 the beam 22 is shown as being let into a stepped recess in the inner side of the skirt 40 and secured by horizontal bolts 41 to the vertical inner side face of the rim of the skirt. The right hand part of FIG. 5 shows an alternative arrangement in which the beam 22 is abutted against the flat horizontal lower face of the skirt 40 at the level of the lower edges of the bearing caps 17, and is secured to the skirt by vertical bolts 42. The lubricating oil sump 27 is also secured to the skirt 40 of the crankcase.

What we claim as our invention and desire to secure by Letters Patent is:

1. A multi-cylinder reciprocating piston machine including a crankshaft supported in a crankcase of the open bottom type by means of main bearings having detachable bearing caps, said open bottom crankcase being closed below by means of a sump, said crankshaft having cranks coupled by means of connecting rods to a set of recriprocating pistons sliding in cylinders and being removably mounted in said crankcase through the open bottom thereof by removing said sump and said detachable bearing caps, said machine comprising a rigid, stiffening beam means for attentuating the vibrational noise generated during the operation of said machine, said beam means being located in the space defined by the crankcase and the sump and rigidly interconnecting said bearing caps of the main bearings secured to the bearing caps and extending along the crankshaft in the crankcase.

2. A machine as claimed in claim 1 in which a first set of bolts secures the bearing caps to the crankcase, and in which further bolts secure the beam to the bearing caps, whereby the crankshaft can first be assembled to the crankcase in the main bearing caps whereafter the beam can be secured to the assembled bearing caps.

3. A machine as claimed in claim 2 in which dowel locating means locates the beam with respect to the bearing caps.

4. A machine as claimed in claim 2 in which tenon locating means locates the beam with respect to the bearing caps.

5. A machine as claimed in claim 1 in which the beam comprises a flat plate formed with apertures and ribs.

6. A machine as claimed in claim 1 in which the beam is formed with oil ways which carry engine lubricating oil.

7. A machine as claimed in claim 1 in which an oil pump is carried by the beam forming part of a lubrication system of the machine.

8. A machine as claimed in claim 7 in which the oil pump includes a casing which is formed as an integral part of the beam.

9. A machine as claimed in claim 1 in which the crankcase is formed with an integral skirt protruding downwardly on both sides of the bearing caps, and in which the beam is bolted to the skirt.

* * * * *